United States Patent
Hatanaka et al.

(10) Patent No.: US 6,564,639 B1
(45) Date of Patent: May 20, 2003

(54) ANGULAR SPEED SENSOR

(75) Inventors: Masakazu Hatanaka, Osaka (JP); Satoshi Ouchi, Hyogo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 60 days.

(21) Appl. No.: 09/889,381
(22) PCT Filed: Nov. 15, 2000
(86) PCT No.: PCT/JP00/08038
§ 371 (c)(1), (2), (4) Date: Oct. 19, 2001
(87) PCT Pub. No.: WO01/36910
PCT Pub. Date: May 25, 2001

(30) Foreign Application Priority Data

Nov. 16, 1999 (JP) ............................................. 11-325096

(51) Int. Cl.[7] ................................................. G01P 9/04
(52) U.S. Cl. ..................................................... 73/504.16
(58) Field of Search ........................ 73/504.16, 504.15, 73/504.12; 310/329, 370

(56) References Cited

U.S. PATENT DOCUMENTS 5,854,427 A * 12/1998 Terada et al. ............ 73/504.16
6,523,410 B2 * 2/2003 Matsubara et al. ...... 73/504.16

FOREIGN PATENT DOCUMENTS

| EP | 0 955 519 | 11/1999 |
| JP | 8-304075 | 11/1996 |
| JP | 9-273933 | 10/1997 |
| JP | 10-221087 | 8/1998 |

* cited by examiner

Primary Examiner—John E. Chapman
(74) Attorney, Agent, or Firm—Wenderoth, Lind & Ponack, L.L.P.

(57) ABSTRACT

The present invention aims at improving detection sensitivity of an angular rate sensor that uses a tuning fork vibrator composed of mono-quartz piezoelectric material such as crystallized quartz. To achieve this purpose, the present invention includes a tuning fork vibrator (10) having two tuning fork prongs (10a) and (10b), and a tuning fork base (10c), comprised of two vibrators (20) and (30) directly bonded into one piece in an orientation of their thickness in a manner that they are oriented in a direction of crystallographic axis that produces piezoelectric phenomenon of reversed polarity with respect to each other in a lateral direction. There are electrodes (5), (6), (7) and (8) for detection, disposed to interior-side surfaces and exterior-side surfaces of both of the tuning fork prongs (10a) and (10b), and electrodes (1) and (2) for driving, disposed to both of the tuning fork prongs (10a) and (10b) in a such relation to the electrodes (5), (6), (7) and (8) for detection as to cancel capacitive couplings from the driving side to the detection side.

15 Claims, 7 Drawing Sheets

ANGULAR SPEED SENSOR

FIELD OF THE INVENTION

The present invention relates to an angular rate sensor used for an attitude controller and navigation system of a moving body such as an aircraft, an automobile, a robot, a ship, a vehicle or the like, a hand-movement compensator of a still camera, a video camera or the like, or a remote controller.

BACKGROUND OF THE INVENTION

In an angular rate sensor of the above kind, a U-shaped piezoelectric element is provided with driving electrodes and sensor electrodes, and tuning fork prongs of the piezoelectric element are driven by a signal supplied by a single driving power supply connected to the driving electrodes. While they are being driven, an angular rate signal is output from the sensor electrodes.

In recent years, there have been suggested angular rate sensors that use mono-quartz piezoelectric elements such as crystallized quartz, lithium-tantalate, and the like as vibrating members. According to these suggestions, there is the possibility of supplying a smaller and less expensive angular rate sensor than the conventional angular rate sensor having a structure that comprises a piezoelectric element made of ceramic bonded to a vibrator of metallic material.

In the angular rate sensor of the prior art that uses a mono-quartz piezoelectric element, a tuning fork vibrator is composed of a pair of prongs connected firmly at one of their ends with a base. In some instances, they are of a one-piece structure, which is cut out from a quartz plate. The tuning fork vibrator constructed as above is provided with a pair of driving electrodes disposed to one of the prongs in an orientation of its major surfaces for driving the tuning fork vibrator piezoelectrically at the resonance frequency. The tuning fork vibrator is driven electrically by an external oscillator circuit. There are also provided on the other prong a monitor electrode for detecting amplitude of vibration of this tuning fork vibrator produced by the oscillator circuit, a sensor electrode for piezoelectrically detecting a stress produced by the Coriolis' force acting on the prong in a direction orthogonal to its major surfaces responsive to an angular rate impressed around an axis of the tuning fork vibrator, and a ground electrode.

An electric charge generated in the monitor electrode is amplified by an external circuit. Thereafter, the oscillator circuit is controlled by an AGC (automatic gain controller) in a manner that the vibration amplitude of the tuning fork vibrator becomes constant by comparing it with a pre-established reference signal. On the other hand, a signal produced by the Coriolis' force and output by the sensor electrode is amplified first by an external amplifier circuit. It is then detected in a synchronized vibration of the tuning fork detected by the monitor electrode, so as to demodulate the signal by the Coriolis' force, which is modulated by the tuning fork vibrator. A sensor output is produced after undesired signals within a band are cut off by an LPF (low pass filter).

In the angular rate sensor constructed as above, however, another circuit is required to separate a mixed-in signal, because there exists a coupling of a capacitive component induced in the sensor electrode by the driving signal. Since the mixed-in signal is not completely separable, it gives rise to a problem that a portion of the signal always remains. This has acted as undesired signal noises to degrade detecting performance of the sensor, and prevented it from practical use on a full-scale basis.

SUMMARY OF THE INVENTION

The present invention is intended to provide an angular rate sensor capable of obviating an influence of the above-stated undesired noises originating from the coupling of capacitive component, thereby improving the detecting performance.

In order to solve the problem, an angular rate sensor of this invention includes a first vibrator having at least two prongs and at least one base connecting the prongs composed of mono-quartz piezoelectric material, and a second vibrator composed of mono-quartz piezoelectric material in a shape generally similar to that of the first vibrator. The first vibrator and the second vibrator are directly bonded into one piece in an orientation of crystallographic axis that produces the piezoelectric phenomenon of reversed polarity with respect to each other in a lateral direction of the vibrators, and also in an orientation of their thickness, so as to form a tuning fork vibrator having at least two tuning fork prongs and at least one tuning fork base. The tuning fork vibrator is provided with a first electrode and a second electrode on front surfaces of its both prongs, and a third electrode and a fourth electrode disposed to back surfaces of the tuning fork prongs. The tuning fork vibrator is also provided with a fifth, a sixth, a seventh and an eighth electrodes formed as sensor electrodes on surfaces in a driving direction of the two tuning fork prongs. Any one of the first electrode provided on the front surface of one tuning fork prong of the tuning fork vibrator and the third electrode provided on the back surface of the same tuning fork prong is used as a driving electrode. Also, any one of the second electrode provided on the front surface of the other tuning fork prong and the fourth electrode provided on the back surface of the same other tuning fork prong is used as another driving electrode. A driving power supply is connected to supply driving signals of different phases between both of these driving electrodes. Among the above-said sensor electrodes, the fifth electrode and the eighth electrode provided on exterior-side surfaces of the two tuning fork prongs are commonly connected together, and the sixth electrode and the seventh electrode provided on interior-side surfaces of the tuning fork prongs are also commonly connected together. Thus they are so constructed that a sensor signal is tapped from these commonly connected points.

In the angular rate sensor of the described structure, unnecessary couplings of capacitive component can be cancelled out among the individual sensor electrodes, since these unnecessary couplings of capacitive component are produced equally between positive and negative polarities from the driving electrodes to the sensor electrodes, thereby obviating an influence of the noises originating in the couplings of capacitive component, and improving the detecting performance.

THE BEST MODES FOR CARRYING OUT THE INVENTION (Exemplary Embodiment 1)

An exemplary embodiment 1 of the present invention will be described with reference to FIG. 1 through FIG. 4.

Figure 1:
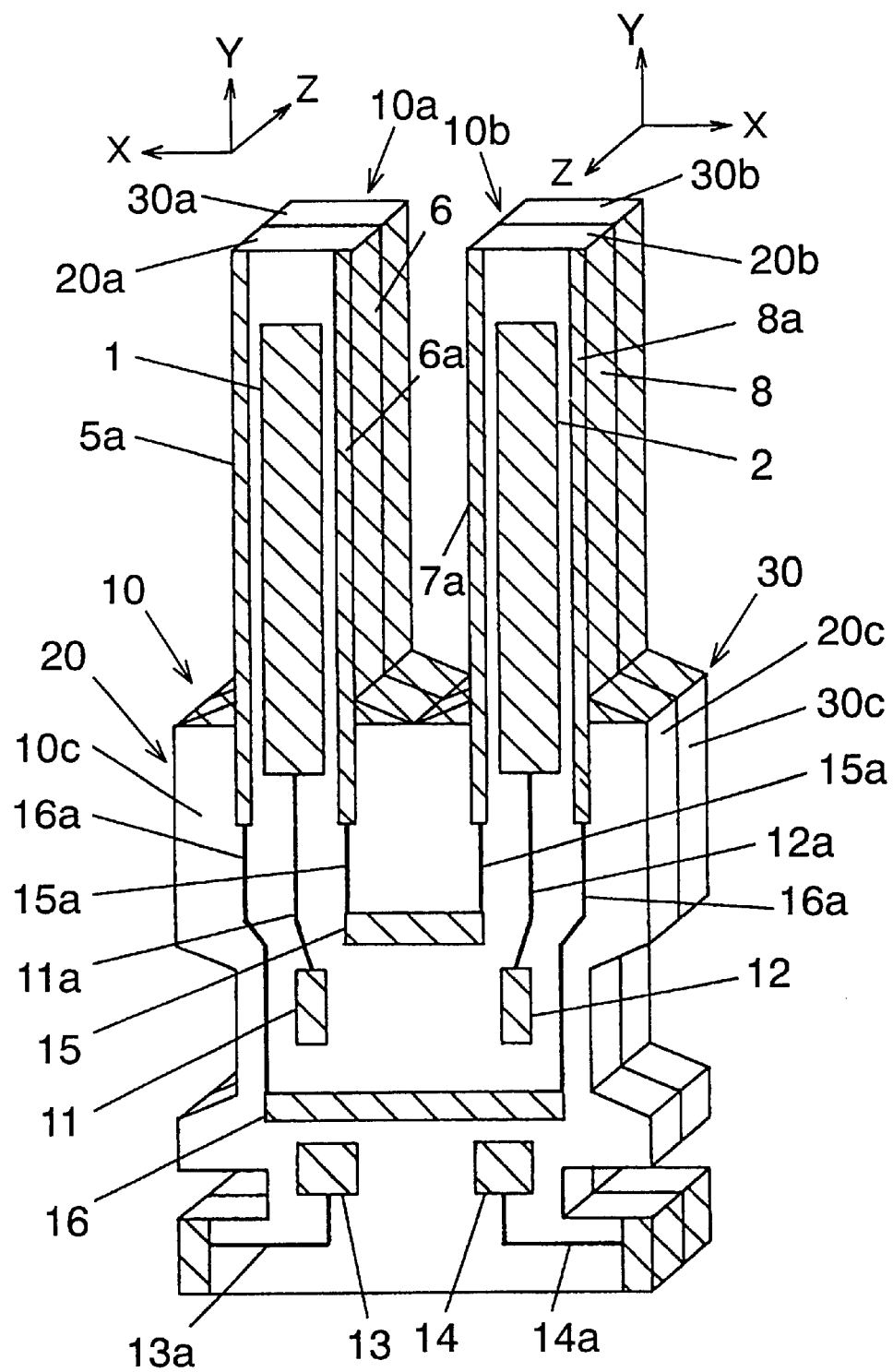
FIG. 1 is a perspective view depicting an angular rate sensor of an exemplary embodiment 1 of the present invention, as observed from the front side.
Figure 2:
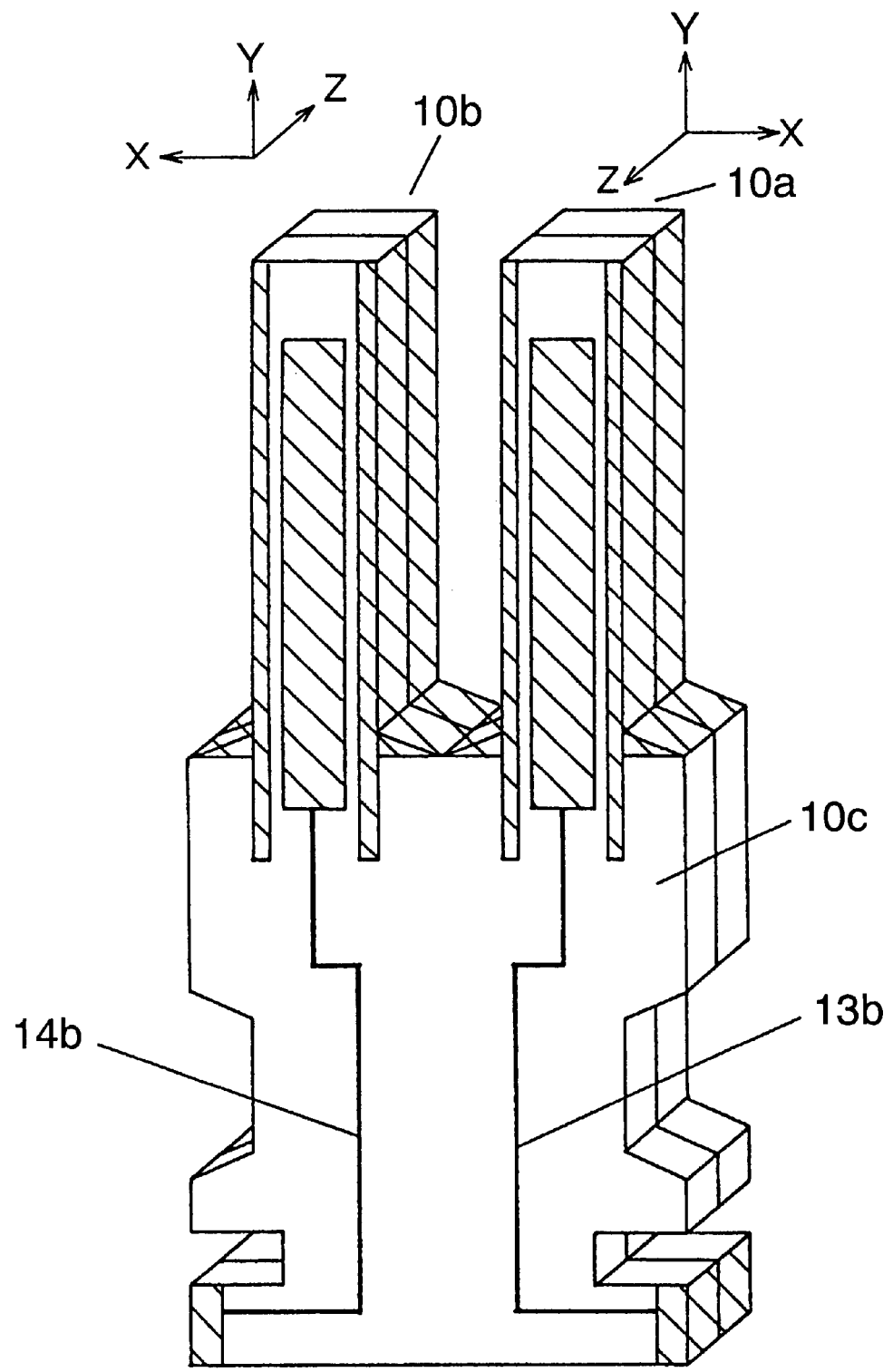
FIG. 2 is a perspective view depicting the angular rate sensor as viewed from the backside.
Figure 3:
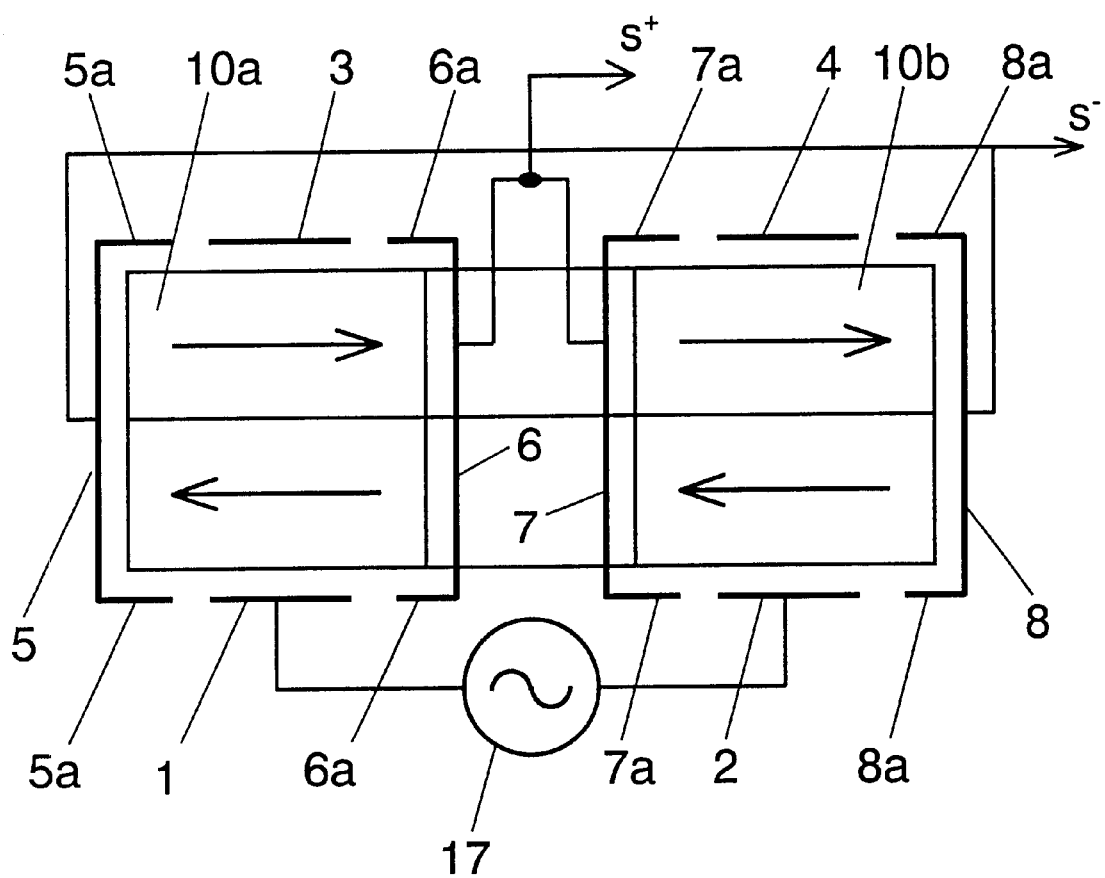
FIG. 3 is a schematic illustration showing an arrangement of electrodes with relation to tuning fork prongs of the same angular rate sensor.
Figure 4:
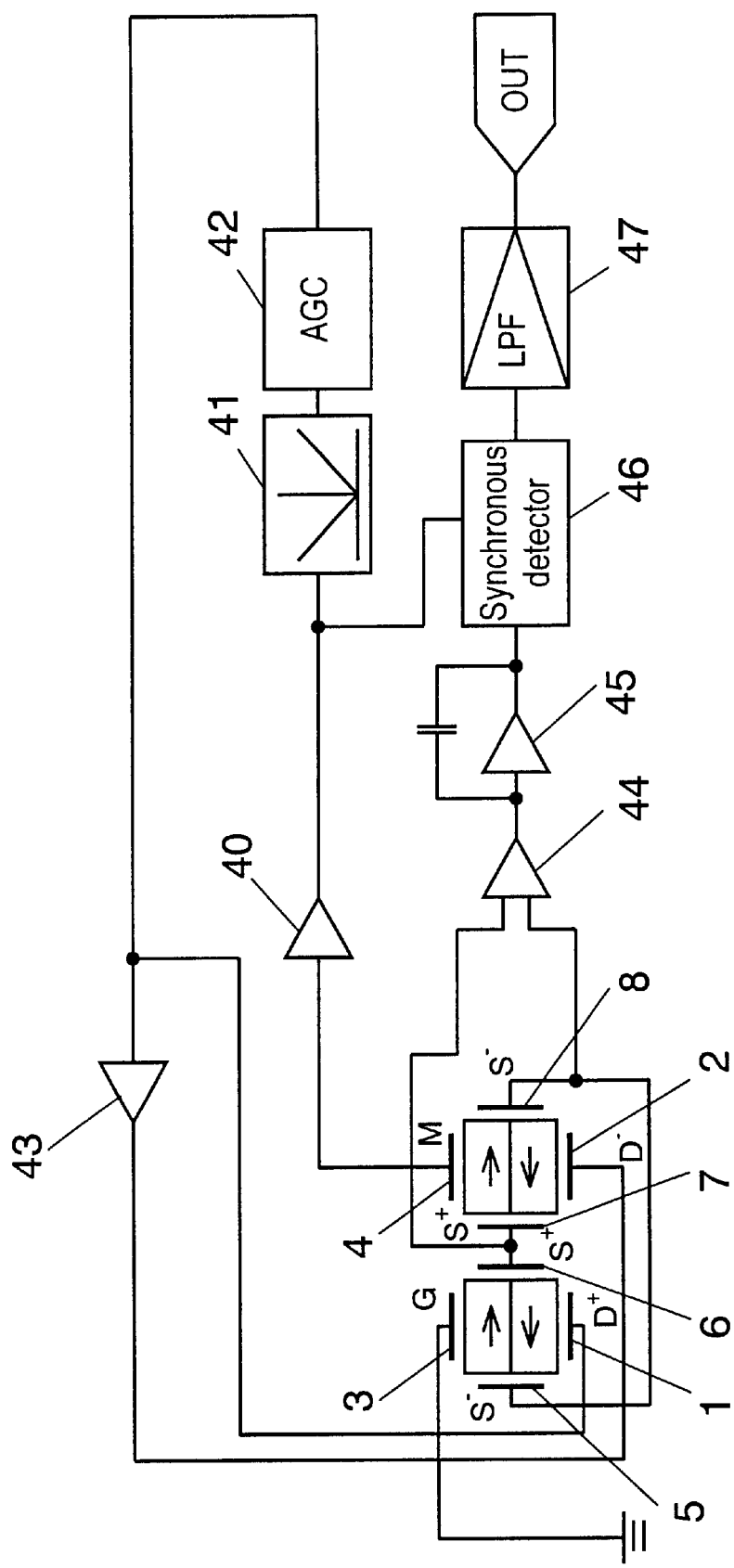
FIG. 4 is a block diagram representing an example of electric circuit of the same angular rate sensor.

FIG. 1 is a perspective view of an angular rate sensor which uses a tuning fork vibrator in this exemplary embodiment 1 of the invention, as it is observed from the front side, and FIG. 2 is another perspective view seen from the backside. FIG. 3 is an illustration showing an arrangement of electrodes of the same angular rate sensor, and FIG. 4 is a circuit diagram of the same angular rate sensor.

In FIG. 1 and FIG. 2, prongs 20a and 20b defining vibrating members are connected with a base 20c defining a fixing member, to form a vibrator 20. Similarly, prongs 30a and 30b defining vibrating members are connected with a base 30c serving a fixing member, to form another vibrator 30. These vibrators 20 and 30 are constructed of monoquartz piezoelectric material such as crystallized quartz. They are integrated into one piece by direct bonding, to form a tuning fork vibrator 10 having a kind of bimorph structure. The vibrator 10 thus has tuning fork prongs 10a, 10b, and a tuning fork base 10c. The direct bonding is made in a manner that surfaces of the members to be bonded are smoothed down properly and processed to develop hydrophilicity, followed by application of hydroxyl for absorption, and heat treatment with the members attached together. This treatment allows the hydroxyl and hydrogen to dissipate from the interface, and the surfaces of the members are bonded. As a result, there provides a bonding condition equivalent to the one-piece structure.

In this case, the vibrator 20 and the vibrators 30 are bonded in a manner that a crystallographic axis of the former is oriented toward the left side and a crystallographic axis of the latter toward the reversed, right side on the plane of the figures. In other words, the vibrators 20 and 30 are bonded in such an orientational relation that their crystallographic axes (directions of X-axis) where the piezoelectric phenomenon occur are opposite to each other within the plane of their major surfaces.

In the foregoing structure of the tuning fork vibrator 10, there are arranged over nearly an entire length of the tuning fork prongs 10a and 10b, the first electrode 1 through the fourth electrode 4 adaptable for the driving electrodes and the fifth electrode 5 through the eighth electrode 8 serving as the sensor electrodes. These electrodes are formed with chromium, or the like, sputtered or deposited first on a raw element material, and gold, silver, aluminum, or the like, sputtered or deposited thereon. In addition, there are conductors and connecting electrode pads for these driving electrodes and sensor electrodes, formed on the tuning fork base 10c of the tuning fork vibrator 10. In this process, the conductors of the driving electrodes and the sensor electrodes are formed to be thinner, on the tuning fork base 10c of the tuning fork vibrator 10, than the driving electrodes and the sensor electrodes formed on the tuning fork prongs 10a and 10b of the tuning fork vibrator 10. In this way, spacing between each conductor of the driving electrodes and each conductor of the adjacent sensor electrodes can be made wider. Accordingly, coupling of capacitive component from the driving electrode to the sensor electrode can be extremely reduced.

In the present exemplary embodiment 1, both the first electrode 1 disposed to the front surface of the tuning fork prong 10a and the second electrode 2 disposed to the front surface of the tuning fork prong 10b serve as the driving electrodes. The third electrode 3 disposed to the back surface of the tuning fork prong 10a serves as a ground electrode, and the fourth electrode 4 disposed to the back surface of the tuning fork prong 10b as a monitor electrode. Furthermore, the fifth electrode 5 and the eighth electrode 8 disposed to the exterior-side surfaces of the tuning fork prongs 10a and 10b are connected together as the sensor electrodes. The sixth electrode 6 and the seventh electrode 7 disposed to the interior-side surfaces of the tuning fork prongs 10a and 10b are also connected together as the other sensor electrodes.

The following electrode pads and their conductors are provided on the surface of the tuning fork base 10c in a form of pattern wiring:

Connecting electrode pads 15 and 16 for the sensor electrodes, and conductors 15a and 16a leading to them;

Connecting electrode pads 11 and 12 for the driving electrodes, and conductors 11a and 12a leading to them;

A connecting electrode pad 13 for the ground electrode and a connecting electrode pad 14 for the monitor electrode, and conductors 13a and 14a leading to them.

In this connection, the conductors 13a and 14a leading from the ground electrode and the monitor electrode to the connecting electrode pads 13 and 14 are pattern-wired on the back surface of the tuning fork base 10c and routed to the front surface. FIG. 3 shows an arrangement of the electrodes in this exemplary embodiment 1.

Furthermore, in this exemplary embodiment 1, the fifth electrode 5 and the eighth electrode 8 disposed to the exterior-side surfaces of the tuning fork prongs 10a and 10b are bent and so extended onto the front surfaces and the back surfaces of the tuning fork prongs 10a and 10b that they include extended electrodes 5a and 8a in juxtaposition to the first electrode 1 through the fourth electrode 4 with a given space. Likewise, there are also extended electrodes 6a and 7a provided on the interior-side surfaces of the tuning fork prongs 10a and 10b.

The angular rate sensor of this exemplary embodiment 1 operates in a manner as described hereinafter. Here, an alternating signal having a difference in phase by 180° is supplied from a driving power supply 17 to the first electrode 1 and the second electrode 2 functioning as the driving electrodes. The tuning fork prongs 10a and 10b vibrate from right to left, or in the horizontal direction, in FIG. 3.

This operation will be described in more detail. Assuming that, at any given point of time, an alternating signal 17 is applied between the first electrode 1 and the second electrode 2 with positive electric field impressed on the first electrode 1, and negative electric field on the second electrode 2, then a left half from the lateral center of the tuning fork's left prong 10a would expand, because the electric field of a same direction as an electrical axis, or a direction of polarization is impressed on the left half from the lateral center of the tuning fork's left prong 10a. A right half from the lateral center of the tuning fork's left prong 10a would shrink because it is impressed with the electric field of a direction opposite the electrical axis or the direction of polarization. As the result, the tuning fork's left prong 10a would bend inwardly, or the right side in FIG. 3.

However, when the signal supplied from the driving power supply 17 is subsequently reversed, then the tuning fork's left prong 10a bends outwardly, i.e. the left side in FIG. 3, on the contrary. Resonant vibration takes place by repeating the above. In respect of the tuning fork' right prong 10b, electric field of a direction opposite the electrical axis or the direction of polarization is impressed upon a left half from the lateral center of the tuning fork's right prong 10b, at the same moment, as opposed to the operation for the tuning fork's left prong 10a. An action of shrinkage occurs in the left half from the lateral center of the tuning fork's right prong 10b. At this moment, an action of extension occurs in the right half from the lateral center of the tuning fork's right prong 10b because it is impressed with electric field in the same direction as the electrical axis or the direction of polarization. As the result, the tuning fork's right prong 10b bends inwardly, i.e. the left side in FIG. 3.

However, in the next moment, that is, when the signal supplied from the driving power supply 17 is reversed, the tuning fork's right prong 10b now bends outwardly, or the right side in FIG. 3, on the contrary. Resonance occurs by repeating the above.

In a state of resonation as described above, both of the tuning fork prongs 10a and 10b bend in a direction of their thickness due to a force produced by the Coliolis' principle in a direction orthogonal to a direction of their vibration, when an angular rate is impressed. This results in generation of electric charges as angular rate signals corresponding to an extent of the bend in the fifth through the eighth electrodes 5, 6, 7 and 8 functioning as the sensor electrodes. The electric charges are output through commonly connected points S+ and S−.

This operation will also be described in further detail. When an angular rate is so placed that the tuning fork's left prong 10a bends upward and the tuning fork's right prong 10b bends downward in FIG. 3, for instance, due to the Coriolis's force, an electric charge in the same direction as the electrical axis or the direction of polarization is generated because a lower side of the tuning fork's left prong 10a with respect to its center in the direction of thickness expands. And, an upper side of the tuning fork's left prong 10a with respect to the center in the direction of thickness shrinks. This results in generation of an electric charge in a direction opposite the electrical axis or the direction of polarization. At this moment, an electric charge in the direction opposite the electrical axis or the direction of polarization is generated in a lower side of the tuning fork's right prong 10b with respect to its center in the direction of thickness, since it shrinks as opposed to the tuning fork's left prong 10a. And, an upper side of the tuning fork's right prong 10b with respect to its center in the direction of thickness expands. This results in generation of an electric charge in the same direction as the electrical axis or the direction of polarization. In this state, therefore, positive charge is generated on the commonly connected point S+, and negative charge on the point S−. The angular rate can be determined by detecting them. Then, when the tuning fork's left prong 10a bends downward and the tuning fork's right prong 10b bends upward in FIG. 3 due to the Coriolis's force, negative charge is generated on the commonly connected point S+, and positive charge on the point S−, because the electric charges completely opposite to the above are generated at this time from both of the tuning fork prongs 10a and 10b. The angular rate can be determined by detecting them.

In a state of the above resonation, there are capacitive components coupled to the fifth through the eighth electrodes 5, 6, 7 and 8 defining the sensor electrodes on the individual side surfaces from the first electrode 1 and the second electrode 2 defining the driving electrodes on the major surface driven by the driving power supply having different polarities. However, there are the fifth through the eighth electrodes 5, 6, 7 and 8 representing the sensor electrodes having same surface area but different polarities, arranged at certain spaces in a symmetrical relation with respect to the first and the second electrodes 1 and 2 serving as the driving electrodes. Therefore, when positive charge, for instance, is now capacitively coupled from the first electrode 1, or the driving electrode, to the fifth and the sixth electrodes 5 and 6, or the sensor electrodes, negative charge of the same level is also capacitively coupled from the second electrode 2 to the seventh and the eighth electrodes 7 and 8. Hence, these couplings of the capacitive components are canceled in the fifth through the eighth electrodes 5, 6, 7 and 8, or the individual sensor electrodes.

There may be such cases that parts of the capacitive components coupled to the fifth through the eighth electrodes, or the individual sensor electrodes, are output without being canceled due to small deviation in the electrode pattern. However, since there are extended electrodes 5a, 6a, 7a and 8a provided as parts of the electrodes extended from the side surfaces onto the major surfaces, and that spaces are provided equally between patterns of the first electrode 1 or the driving electrode and the electrodes 5a and 6a, as well as the second electrode 2 or the driving electrode and the electrodes 7a and 8a, the coupled capacitive components are canceled by these electrodes.

Furthermore, there may be cases that a portion of electrode remains un-etched if there is a foreign particle between the patterns, and this can be a cause of producing a coupling of capacitive component. Still, this coupling of capacitive component can be canceled by finely adjusting a surface area of any of the extended electrodes 5a, 6a, 7a and 8a, thereby realizing highly accurate detection of angular rate.

A similar effect can be attained by making fine adjustment of the first electrode 1 through the fourth electrode 4, instead of adjusting the extended electrodes Sa, 6a, 7a and 8a.

FIG. 4 is an example of circuit block diagram of the angular rate sensor. Described first pertains to a driving circuit. The driving circuit functions as a self-excited oscillator comprising a current amplifier circuit 40, a comparator circuit 41, an AGC circuit 42, and an inverter circuit 43. An electric charge corresponding to amplitude of vibration is generated in the monitor electrode 4 of the tuning fork vibrator 10. The current amplifier 40 detects this electric charge, and the detected electric charge is compared in the comparator circuit 41 with a predetermined value established in advance for stabilization of the amplitude of vibration. When the value compared is larger than the predetermined value, for instance, the AGC circuit 42 applies sinusoidal waves to the driving electrode 1 and the driving electrode 2, via the inverter circuit 43, in a manner to reduce the level of vibration amplitude. If the value compared is smaller than the predetermined value, on the other hand, the AGC circuit 42 applies the sinusoidal waves to the driving electrode 1 and the driving electrode 2, via the inverter circuit 43, in a manner to increase the level of vibration amplitude. The amplitude of vibration of the tuning fork vibrator 10 is controlled stably by repeating the above operation.

Next, in a detector circuit, electric charges proportional to an angular rate with different polarities are generated respectively in the sensor electrodes 5 and 8, and 6 and 7 of the tuning fork vibrator 10, because of the Coriolis's force generated when the angular rate is applied to it. A differential amplifier circuit 44 detects these electric charges, and a phase shifter circuit 45 advances their phases by 90°. Afterwards, a synchronous detector 46, to which a signal through the current amplifier 40 of the driving circuit is input, carries out synchronous detection, to detect only an angular rate signal. The undesired signal components from the individual sensor electrodes 5, 6, 7 and 8 are canceled at this time by the differential amplifier circuit 44. The LPF circuit 47 then converts this detected signal into DC, to detect the angular rate signal as a DC component.

Figure 5:
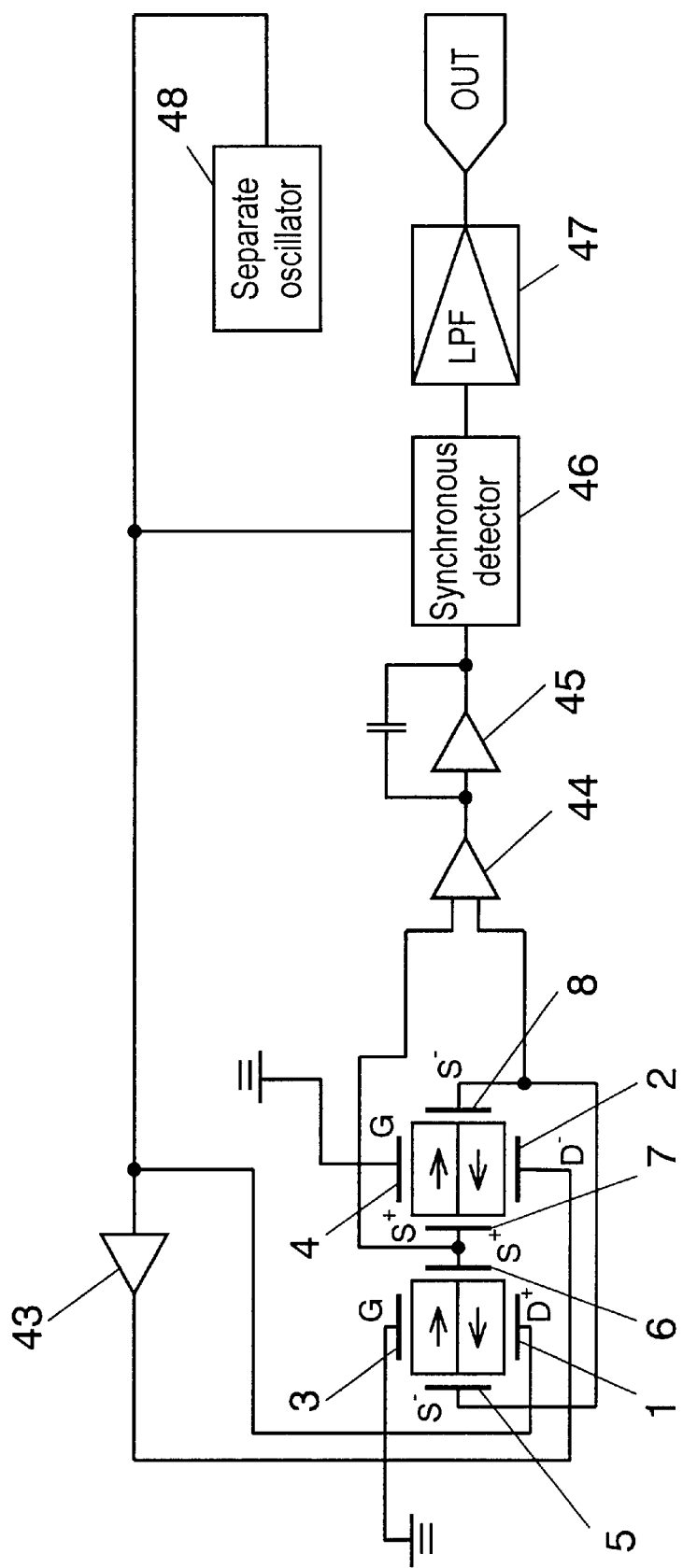
FIG. 5 is a block diagram showing another example of electric circuit of the same angular rate sensor.

In this connection, a separately excited oscillator circuit 48 may be used for the driving circuit, as shown in FIG. 5. If this is the case, the fourth electrode 4 used as the monitor electrode needs to be connect only to the ground.

Figure 6:
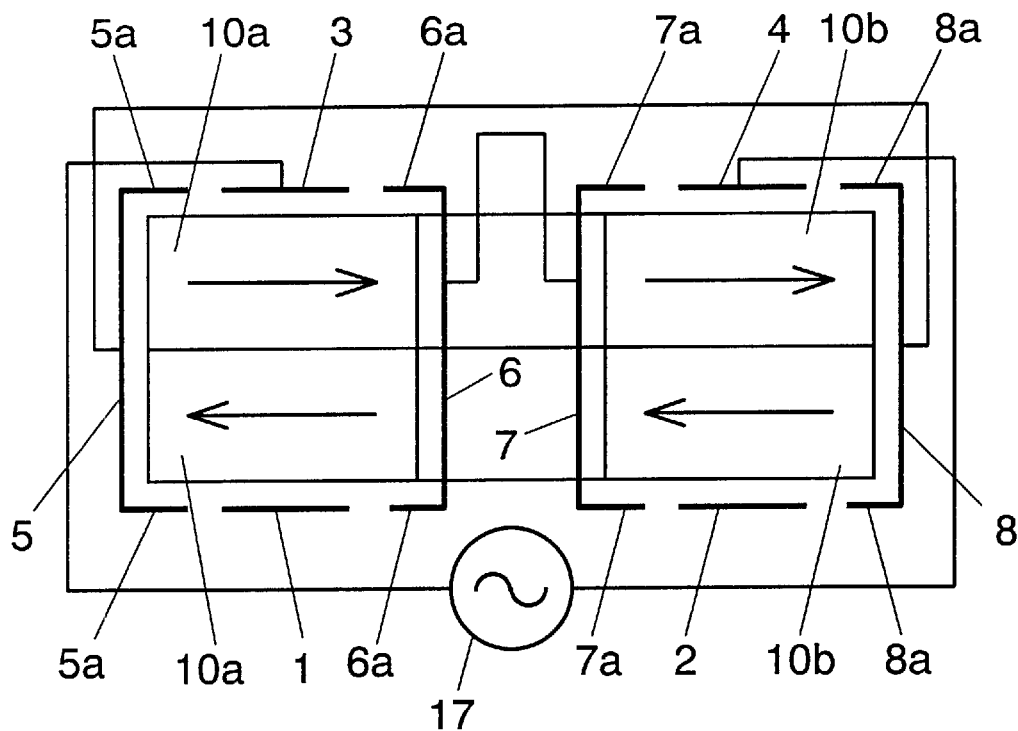
FIG. 6 is a schematic illustration showing another example of electrode arrangement with relation to the tuning fork prongs of th same angular rate sensor.

In this exemplary embodiment 1, what has been described is the case in which the first electrode 1 and the second electrode 2 disposed to the front surfaces of the tuning fork prongs 10a and 10b are used as the driving electrodes, the third electrode 3 and the fourth electrode 4 disposed to the back surfaces of the tuning fork prongs 10a and 10b may instead be used as the driving electrodes as shown in FIG. 6. In this case, the connecting electrode pad 13 for the ground electrode and the connecting electrode pad 14 for the monitor electrode, both shown in FIG. 1, can be used as connecting electrode pads for the driving electrodes. The pattern wiring provided on the front surface of the tuning fork base 10c of the tuning fork vibrator 10, serving as the conductors 15a and 16a leading to the electrode pads 15 and 16 for the sensor electrodes are kept further from the pattern wiring serving as the conductors 13a and 14a leading to the electrode pads for the driving electrodes, rather than being juxtaposed with them. This reduces the coupling of capacitive components among the pattern wiring serving as the conductors. This is advantageous in respect of the noises that originate from the coupling of capacitive components.

Figure 7:
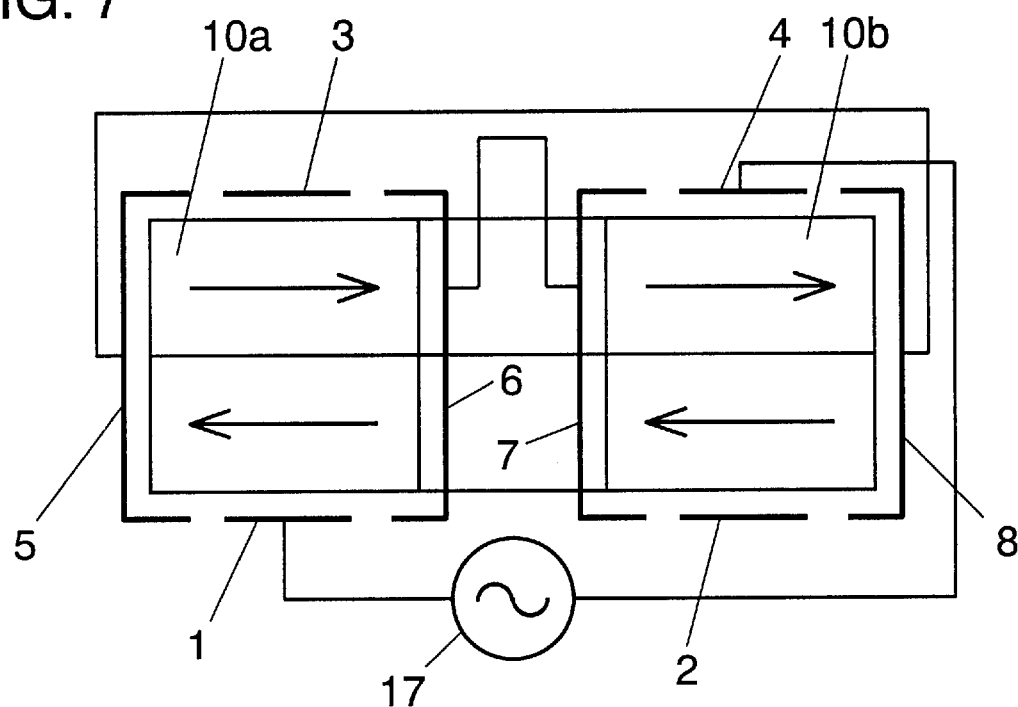
FIG. 7 is a schematic illustration of electrode arrangement representing another embodied example of the angular rate sensor.
Figure 8:
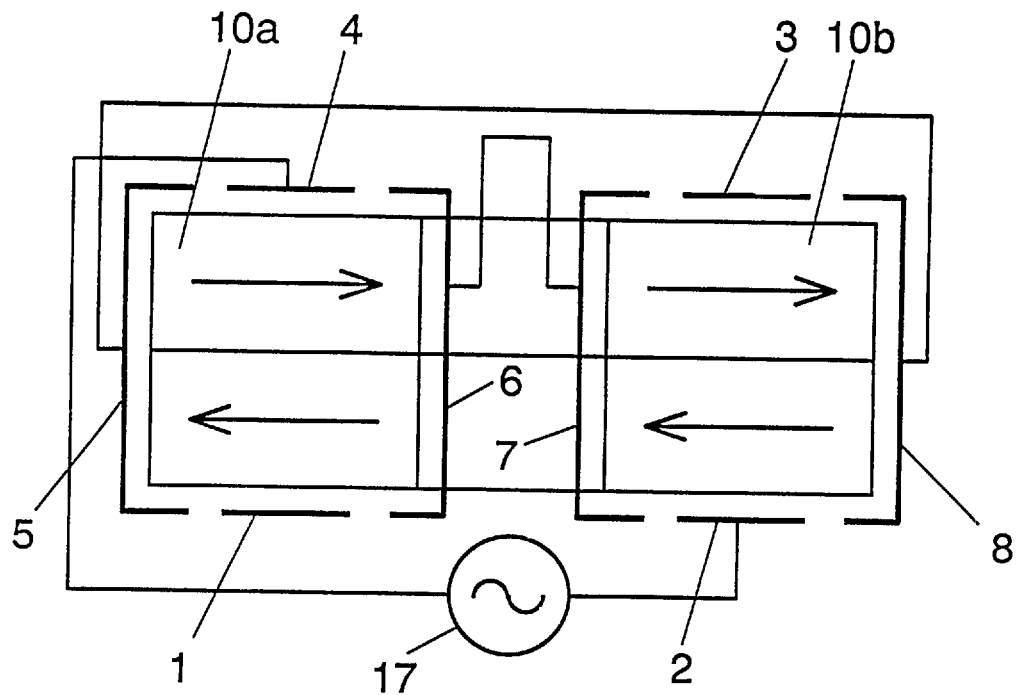
FIG. 8 is a schematic illustration of electrode arrangement representing still another embodied example of the angular rate sensor.

Besides, the first electrode 1 and the fourth electrode 4 located in the diagonal positions on the two tuning fork prongs 10a and 10b may be used as the driving electrodes, as shown in FIG. 7. Or, the second electrode 2 and the third electrode 3 may be used as the driving electrodes as shown in FIG. 8. In these instances, the two remaining electrodes are used as the ground electrode and the monitor electrode. In these instances, there is a canceling effect on the unnecessary couplings of capacitive components produced by diagonal vibrations and the like due to variations in fabrication of the vibrator, which is advantageous against the noises.

Figure 9:
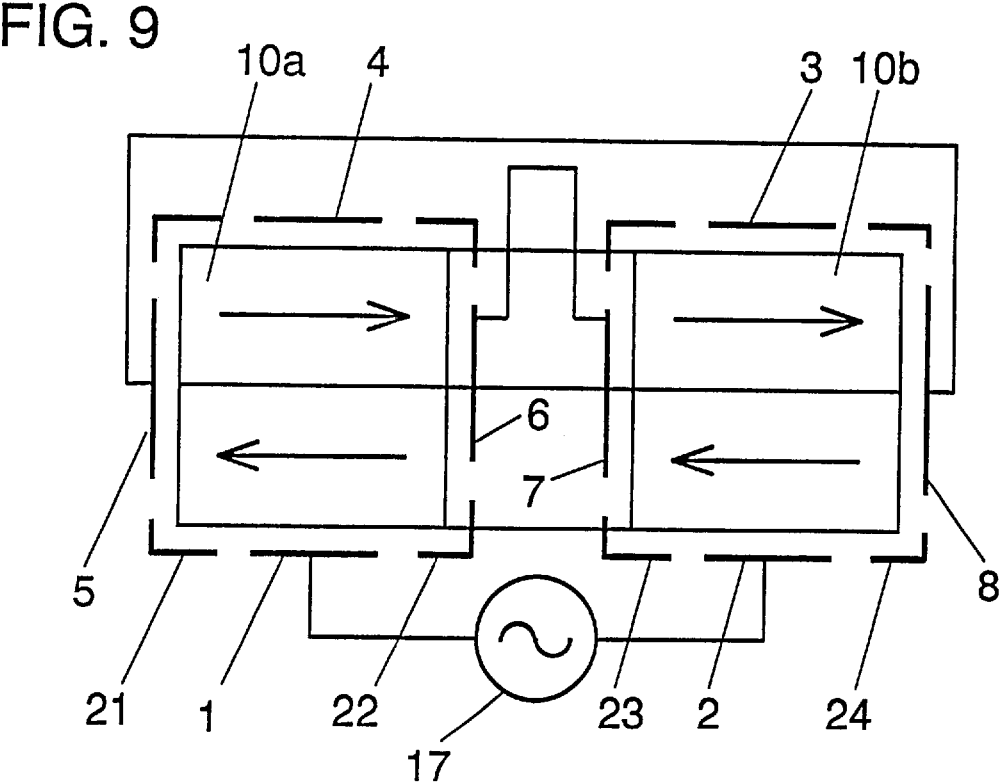
FIG. 9 is a schematic illustration of electrode arrangement representing yet another embodied example of the angular rate sensor.

Furthermore, it may be desirable to provide ground electrodes 21, 22, 23 and 24 individually between the first electrode 1, the second electrode 2 representing the driving electrodes, and the fifth through the eighth electrodes 5, 6, 7 and 8 serving as the sensor electrodes, as shown in FIG. 9, so as to cut off the couplings of capacitive components from the driving electrodes to the sensor electrodes. In this instance, it is also desirable to dispose electrodes similar to these ground electrodes 21, 22, 23 and 24 between the third electrode 3 and the fourth electrode 4 not used as the driving electrode, and the fifth through the eighth electrodes 5, 6, 7 and 8 serving as the sensor electrodes, in order to keep lateral balance of the tuning fork vibrator.

Industrial Applicability

As described above, the angular rate sensor of this invention includes a first vibrator comprising at least two prongs and at least one base connecting the prongs, composed of mono-quartz piezoelectric material, and a second vibrator also composed of mono-quartz piezoelectric material in a shape generally similar to that of the first vibrator. The first vibrator and the second vibrator are integrated by bonding them directly in a direction of their thickness. The first vibrator and the second vibrator are bonded in an orientation of crystallographic axis that produces the piezoelectric phenomenon in reversed polarity with respect to each other in a lateral direction of these vibrators. In this tuning fork vibrator having the two tuning fork prongs and the tuning fork base, there are provided with fifth, sixth, seventh and eighth electrodes, serving as sensor electrodes, on surfaces of both of the tuning fork prongs in a direction of driving the tuning fork vibrator. Among these sensor electrodes, the fifth and the eighth electrodes on the exterior-side surfaces of the tuning fork prongs, and the sixth and the seventh electrodes on the interior-side surfaces of the tuning fork prongs are connected commonly together. There are also provided with first, second, third and fourth electrodes as driving electrodes on the front surfaces and the back surfaces of both of the tuning fork prongs. Driving signals having different phases are supplied between the driving electrodes of the both tuning fork prongs. With the foregoing structure, couplings of capacitive components from the driving electrodes to the sensor electrodes can be canceled, thereby realizing the highly accurate angular rate sensor.

What is claimed is:

1. An angular rate sensor comprising:

a tuning fork vibrator having at least two tuning fork prongs and at least one tuning fork base, said tuning fork vibrator comprising a first vibrator having a first orientation of crystallographic axis and a second vibrator having a second orientation of crystallographic axis, said first vibrator and said second vibrator being directly bonded into one piece such that the first orientation of crystallographic axis is opposite to the second orientation of crystallographic axis thereby producing a piezoelectric phenomenon of reversed polarity with respect to each other in a first direction and a second direction;

a first electrode disposed on a front surface of a first tuning fork prong;

a second electrode disposed on a front surface of a second tuning fork prong;

a third electrode disposed on a back surface of one of said first and said second tuning fork prongs;

a fourth electrode disposed on a back surface of another of said first and said second tuning fork prongs;

fifth through eighth electrodes disposed on two surfaces of said first tuning fork prong and two surfaces of said second tuning fork prong, respectively; and a driving power supply operable to supply driving signals, wherein said fifth through said eighth electrodes are sensor electrodes and are parallel to one another in a driving direction of said tuning fork vibrator, wherein said first vibrator comprises at least two prongs and at least one base connecting said at least two prongs, wherein said first vibrator comprises a first mono-quartz piezoelectric material, wherein said second vibrator comprises a second mono-quartz piezoelectric material in a shape generally similar to said first vibrator, wherein one of said first electrode and said third electrode is a first driving electrode, and one of said second electrode and said fourth electrode is a second driving electrode, wherein said driving power supply is operable to supply a first driving signal having a first phase to said one of said first electrode and said third electrode connected thereto, wherein said driving power supply is operable to supply a second driving signal having a second phase different from said first phase to said one of said second electrode and said fourth electrode connected thereto, wherein said fifth electrode is disposed on an exterior-side surface of one of said first tuning fork prong and said second tuning fork prong, wherein said eighth is disposed an other exterior-side surface of the other of said first tuning fork prong and said second tuning fork prong, wherein said sixth electrode is disposed on an interior-side surface of one of said first tuning fork prong and said second tuning fork prong, wherein said seventh electrode is disposed on an interior-side surface of the other of said first tuning fork prong and said second tuning fork prong, wherein said fifth electrode and said eighth electrode are commonly connected together, wherein said sixth electrode and seventh electrode are commonly connected together, and wherein said fifth through said eighth electrodes are arranged and connected to enable said angular rate sensor to obtain a sensor signal from points of the common connections.

2. The angular rate sensor as set forth in claim 1, wherein said first electrode and said second electrode are said first driving electrode and said second driving electrode, respectively, or said third electrode and said fourth electrode are said first driving electrode and said second driving electrode, respectively.

3. The angular rate sensor as set forth in claim 1, wherein said first electrode and said fourth electrode are disposed on different tuning fork prongs and are said first driving electrode and said second driving electrode, respectively, or said second electrode and said third electrode are disposed on different tuning fork prongs and are said first driving electrode and said second driving electrode, respectively.

4. The angular rate sensor as set forth in claim 1, wherein one of said first through said fourth electrodes is a ground electrode, wherein another of said first through said fourth electrodes is a monitor electrode, and wherein said driving power supply comprises a self-excited oscillator.

5. The angular rate sensor as set forth in claim 1, wherein two of said first through said fourth electrodes are ground electrodes, and wherein said driving power supply comprises a separately excited oscillator.

6. The angular rate sensor as set forth in claim 1, further comprising a ground electrode disposed between one of said driving electrodes and one of said sensor electrodes.

7. The angular rate sensor as set forth in claim 1, wherein each of said sensor electrodes is additionally disposed on at least one of the front surface of said first tuning fork prong, the back surface of said first tuning fork prong, the front surface of said second tuning fork prong and the back surface of said second tuning fork prong.

8. The angular rate sensor as set forth in claim 1, wherein one of said sensor electrodes is additionally disposed on at least one of the front surface of said first tuning fork prong, the back surface of said first tuning fork prong, the front surface of said second tuning fork prong and the back surface of said second tuning fork prong and is reduced in size to thereby equalize coupling capacities with said driving electrodes.

9. The angular rate sensor as set forth in claim 1, wherein one of said driving electrodes is additionally disposed on at least one of the front surface of said first tuning fork prong, the back surface of said first tuning fork prong, the front surface of said second tuning fork prong and the back surface of said second tuning fork prong and is reduced in size to thereby equalize coupling capacities with said sensor electrodes.

10. The angular rate sensor as set forth in claim 1, wherein said sensor electrodes are arranged such that polarities of said sensor electrodes are symmetrically provided with respect to said driving electrodes to cancel an electrical potential gradient of different coupling capacities between said sensor electrodes and said driving electrodes.

11. The angular rate. sensor as set forth in claim 1, wherein said sensor electrodes are symmetrically arranged at a predetermined space with respect to said driving electrodes to cancel an electrical potential gradient ofdifferent coupling capacities between said sensor electrodes and said driving electrodes.

12. The angular rate sensor as set forth in claim 1, further comprising:

a plurality of electrode pads, each electrode pad corresponding to one of said first through eighth electrodes; and a plurality of conductors formed on said at least one tuning fork base, each conductor connecting one of said electrode pads to a corresponding electrode so as to reduce a coupling capacity therebetween.

13. The angular rate sensor as set forth in claim 1, further comprising:

a plurality of electrode pads, each electrode pad corresponding to one of the group of said driving electrodes and said sensor electrodes; and a plurality of conductors formed on said at least one tuning fork base, each conductor connecting one of said electrode pads to a corresponding electrode, wherein said first electrode is a monitor electrode and said second electrode is a ground electrode, wherein said third electrode and said fourth electrode are driving electrodes, and wherein said conductors are formed such that conductors connecting said sensor electrodes to corresponding electrode pads do not juxtapose with conductors connecting said driving electrodes to corresponding electrode pads.

14. The angular rate sensor as set forth in claim 1, wherein said angular rate sensor is operable to detect a difference in a coupled capacitive component of a same phase contained in sensor signals from commonly connected sensor electrodes, and to cancel an electrical potential gradient of different coupling capacities between said sensor electrodes and said driving electrodes.

15. The angular rate sensor as set forth in claim 1, wherein said sensor electrodes are additionally disposed on a first area of the front surface of said first tuning fork prong, a second area of the back surface of said first tuning fork prong, a third area of the front surface of said second tuning fork prong and a fourth area of the back surface of said second tuning fork prong, respectively, and wherein the first area through the fourth area are equal in size.

* * * * *

UNITED STATES PATENT AND TRADEMARK OFFICE
CERTIFICATE OF CORRECTION

PATENT NO. : 6,564,639 B1
DATED : May 20, 2003
INVENTOR(S) : Masakazu Hatanaka et al.

It is certified that error appears in the above-identified patent and that said Letters Patent is hereby corrected as shown below:

Title page,
Item [54], Title, change "ANGULAR SPEED SENSOR" to -- ANGULAR RATE SENSOR --.

Column 10,
Line 18, delete "." after "rate".
Line 21, after "of" and before "different" please insert space.

Signed and Sealed this

Twenty-eighth Day of September, 2004

JON W. DUDAS
*Director of the United States Patent and Trademark Office*